United States Patent
Wu et al.

(10) Patent No.: US 10,965,772 B2
(45) Date of Patent: Mar. 30, 2021

(54) INTERFACE INVOCATION METHOD AND APPARATUS FOR HYBRID CLOUD

(71) Applicant: Tencent Technology (Shenzhen) Company Limited, Shenzhen (CN)

(72) Inventors: Xiaoqing Wu, Shenzhen (CN); Baoyuan Liu, Shenzhen (CN); Songjian Zheng, Shenzhen (CN); Dongshui Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 118 days.

(21) Appl. No.: 16/191,323

(22) Filed: Nov. 14, 2018

(65) Prior Publication Data
US 2019/0082026 A1  Mar. 14, 2019

Related U.S. Application Data

(63) Continuation-in-part of application No. PCT/CN2017/092259, filed on Jul. 7, 2017.

(30) Foreign Application Priority Data

Jul. 8, 2016 (CN) .......................... 201610539009.9
Jul. 8, 2016 (CN) .......................... 201610539500.1

(51) Int. Cl.
*H04L 29/08* (2006.01)
*H04L 9/08* (2006.01)
*H04L 9/32* (2006.01)

(52) U.S. Cl.
CPC ........ *H04L 67/2823* (2013.01); *H04L 9/0861* (2013.01); *H04L 9/0894* (2013.01);
(Continued)

(58) Field of Classification Search
CPC . H04L 67/10; H04L 67/2809; H04L 41/5096; H04L 63/08; H04L 41/12;
(Continued)

(56) References Cited

U.S. PATENT DOCUMENTS 8,745,753 B1 * 6/2014 Gottlieb ............. G06Q 30/0277
726/26
8,867,069 B2 * 10/2014 Jazayeri ................ G06F 3/1204
358/1.15
(Continued)

FOREIGN PATENT DOCUMENTS

CN  102255933 A  11/2011
CN  102546735 A  7/2012
(Continued)

OTHER PUBLICATIONS

Tencent Technology, ISRWO, PCT/CN2017/092259, Sep. 28, 2017, 7 pgs.
(Continued)

*Primary Examiner* — Ninos Donabed
(74) *Attorney, Agent, or Firm* — Morgan, Lewis & Bockius LLP

(57) ABSTRACT

The various embodiments described herein include methods, systems, and devices for invoking an interface for a hybrid cloud. In one aspect, a computing system receives, from an invoker, an interface invocation request for a hybrid cloud, the request including a uniform resource locator address and information of a first target cloud platform. In accordance with the request, the computing system determines an interface of the first target cloud platform, e.g., a type of the first target cloud platform, a region of the interface of the first target cloud platform; and an interface within the region as the interface of the first target cloud platform. Next, the computing system sends the request to the interface of the
(Continued)

first target cloud platform and then receives a response from the interface of the first target cloud platform.

20 Claims, 11 Drawing Sheets

(52) U.S. Cl.
CPC .......... *H04L 9/3226* (2013.01); *H04L 9/3247* (2013.01); *H04L 9/3297* (2013.01); *H04L 67/025* (2013.01); *H04L 67/10* (2013.01)

(58) Field of Classification Search
CPC ..... H04L 63/20; H04L 67/12; H04L 41/5051; H04L 67/02; H04L 67/1002; H04L 67/1097; H04L 63/0281; H04L 63/0823; H04L 67/16; H04L 67/34; H04L 67/2823; H04L 9/0861; H04L 9/0894; H04L 9/3226; H04L 9/3247; H04L 9/3297; H04L 67/025; G06F 9/5072; G06F 9/45558; G06F 21/6218
See application file for complete search history.

(56) References Cited

U.S. PATENT DOCUMENTS

| | | | | |
|---|---|---|---|---|
| 8,924,546 | B1* | 12/2014 | Liao | H04M 15/8038 709/224 |
| 10,223,549 | B2* | 3/2019 | Banerjee | H04L 63/083 |
| 10,708,358 | B1* | 7/2020 | Diasti | G06F 16/93 |
| 2011/0072489 | A1* | 3/2011 | Parann-Nissany | H04L 65/605 726/1 |
| 2012/0281706 | A1* | 11/2012 | Agarwal | H04L 12/4633 370/395.53 |
| 2012/0297450 | A1* | 11/2012 | Whittick | H04L 67/1097 726/3 |
| 2012/0300249 | A1* | 11/2012 | Shustef | G06F 3/1287 358/1.15 |
| 2013/0066939 | A1* | 3/2013 | Shao | H04L 67/2814 709/201 |
| 2013/0066940 | A1* | 3/2013 | Shao | H04L 67/1025 709/201 |
| 2014/0059217 | A1* | 2/2014 | Pizurica | H04L 43/08 709/224 |
| 2014/0067990 | A1* | 3/2014 | Abdelhameed | G06F 16/972 709/213 |
| 2014/0165164 | A1* | 6/2014 | Pizurica | G06F 3/0482 726/5 |
| 2015/0046600 | A1 | 2/2015 | Kim | |
| 2015/0295731 | A1 | 10/2015 | Bagepalli et al. | |
| 2017/0034255 | A1* | 2/2017 | Hanney | H04L 67/1097 |
| 2017/0048319 | A1* | 2/2017 | Straub | H04W 12/0027 |
| 2017/0339070 | A1* | 11/2017 | Chang | H04L 47/829 |
| 2017/0346875 | A1* | 11/2017 | Wells | G06F 9/5033 |
| 2017/0372357 | A1* | 12/2017 | Gottlieb | G06Q 30/0277 |
| 2018/0077222 | A1* | 3/2018 | Shnitko | H04L 65/4084 |
| 2018/0253359 | A1* | 9/2018 | Zhang | G06F 17/00 |
| 2018/0287960 | A1* | 10/2018 | Huang | H04L 67/2842 |

FOREIGN PATENT DOCUMENTS

| | | |
|---|---|---|
| CN | 103701761 A | 4/2014 |
| CN | 104113595 A | 10/2014 |
| CN | 104657220 A | 5/2015 |
| CN | 104935568 A | 9/2015 |
| CN | 105306534 A | 2/2016 |
| CN | 106101258 A | 11/2016 |

OTHER PUBLICATIONS

Tencent Technology, IPRP, PCT/CN2017/092259, Jan. 8, 2019, 6 pgs.

* cited by examiner

INTERFACE INVOCATION METHOD AND APPARATUS FOR HYBRID CLOUD

CROSS-REFERENCE TO RELATED APPLICATION

This application is a continuation-in-part application of PCT/CN2017/092259, entitled "METHOD AND DEVICE FOR SCHEDULING INTERFACE OF HYBRID CLOUD" filed on Jul. 7, 2017, which claims priority to Chinese Patent Application No. 201610539500.1, entitled "INTERFACE INVOCATION METHOD, APPARATUS AND SYSTEM FOR HYBRID CLOUD", filed with the State Intellectual Property Office of the People's Republic of China on Jul. 8, 2016, and which also claims priority to Chinese Patent Application No. 201610539009.9, entitled "RESOURCE MONITORING METHOD AND SYSTEM FOR HYBRID CLOUD", filed with the State Intellectual Property Office of the People's Republic of China on Jul. 8, 2016, all of which are incorporated herein by reference in their entirety.

FIELD OF THE TECHNOLOGY

The present disclosure relates to the field of cloud computing technologies, and in particular, to an interface invocation method and apparatus for a hybrid cloud.

BACKGROUND OF THE DISCLOSURE

Cloud computing refers to the delivery of computing services over the Internet. With the development of cloud computing technologies, there are numerous cloud providers (or companies) providing different types of cloud platforms. Cloud computing resources can be deployed in three ways, namely, via: public cloud, private cloud, and hybrid cloud. The cloud platforms may be classified, according to a cloud computing manner, into an Openstack cloud platform, a Qcloud cloud platform, an AWS cloud platform, or the like.

Public clouds are owned and operated by a third-party cloud service provider. All hardware, software, and other supporting infrastructure are owned and managed by the public cloud provider. A private cloud refers to cloud computing resources used exclusively by a single business or organization. All private cloud service and infrastructure are maintained on a private network. A cloud computing technology that combines a public cloud platform with a private cloud platform is referred to as a hybrid cloud. Currently, many enterprises have two kinds of services, an external service and an internal service. When in the external service, in consideration of saving costs, the enterprises hope to apply a public cloud platform; and when in the internal service, in consideration of safety, the enterprises hope to apply a private cloud platform. Therefore, the hybrid cloud is more popular.

Because different types of cloud platforms combined by a hybrid cloud are independently deployed, and interface invocation standards of the different types of cloud platforms are different, a hybrid cloud has various different interface invocation methods that are not uniform. This causes great inconvenience to system application and maintenance of the hybrid cloud.

In addition, in an implementation process of cloud computing, a resource (for example, each index that indicates a running condition of the cloud platform) of a cloud platform needs to be monitored, to help a user learn a running condition of the cloud platform. Because resource monitoring systems between different types of cloud platforms in the existing technology are different, resource monitoring of the hybrid cloud needs to be performed between the different types of cloud platforms by turns. That is, the user needs to switch to another cloud platform to continue to perform resource monitoring after performing resource monitoring on a cloud platform. This leads to the quite low efficiency of resource monitoring of the hybrid cloud.

Accordingly, there is a need for methods, systems, and devices to unify the invocation of a hybrid cloud, so as to improve the convenience and efficiency accessing the services offered by a hybrid cloud.

SUMMARY

In view of this, the present disclosure provides an interface invocation method and apparatus for a hybrid cloud, to unify an interface invocation of the hybrid cloud, and to provide a seamless and easy-to-use connectivity interface to access various cloud platforms.

In accordance with some embodiments, an interface invocation method for a hybrid cloud performed by a computing system comprises: receiving, from an invoker, an interface invocation request for a hybrid cloud, the interface invocation request including a uniform resource locator (URL) address and information of a first target cloud platform; in accordance with the request, determining an interface of the first target cloud platform, including: determining a type of the first target cloud platform according to a cloud platform type parameter in the URL address; determining a region of the interface of the first target cloud platform according to a region parameter in the URL address; and determining an interface within the region as the interface of the first target cloud platform; in accordance with the determining, sending the interface invocation request to the interface of the first target cloud platform; and receiving a response from the interface of the first target cloud platform.

In accordance with some embodiments, an apparatus includes one or more processors and memory storing one or more programs (or one or more modules) to be executed by the one or more processors, the one or more modules including instructions for performing any of the methods described herein.

In accordance with some embodiments, a non-transitory computer readable storage medium stores one or more programs. The one or more programs, which when executed by an apparatus, cause the apparatus to perform any of the operations described herein.

Accordingly, the disclosed methods, systems, and devices can unify an interface invocation of the hybrid cloud, thereby making system application and maintenance of the hybrid cloud more convenient to the user.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely the embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art based on the embodiments in the present disclosure without creative effects shall fall within the protection scope of the present disclosure.

The embodiments of this application are mainly applied to a hybrid cloud. The following describes a system framework of an existing hybrid cloud and a system framework of a hybrid cloud in this application respectively in detail.

Figure 1:
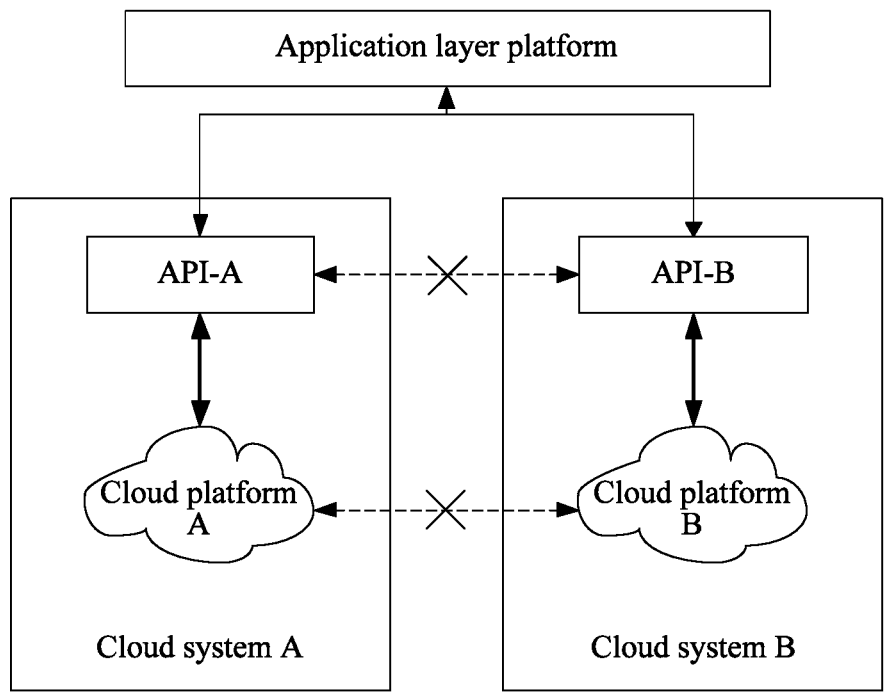
FIG. 1 is a schematic diagram of a system framework of an existing hybrid cloud.

Referring to FIG. 1, FIG. 1 is a schematic diagram of a system framework of an existing hybrid cloud. As shown in FIG. 1, the hybrid cloud includes a cloud system A and a cloud system B. In some embodiments, cloud system A can be a public cloud, a private cloud, or a hybrid cloud. In some embodiments, cloud system B can be a public cloud, a private cloud, or a hybrid cloud. The two systems A and B are independently deployed. An application programming interface API-A corresponding to the cloud system A and an application programming interface API-B corresponding to the cloud system B are relatively independent. Therefore, there is not any association relationship between the cloud system A and the cloud system B. Based on this, when a user needs to invoke, by using an application layer platform, interfaces of a cloud platform A and a cloud platform B to process user business, the API-A and the API-B are separately invoked, i.e., they cannot be uniformly invoked.

Figure 2:
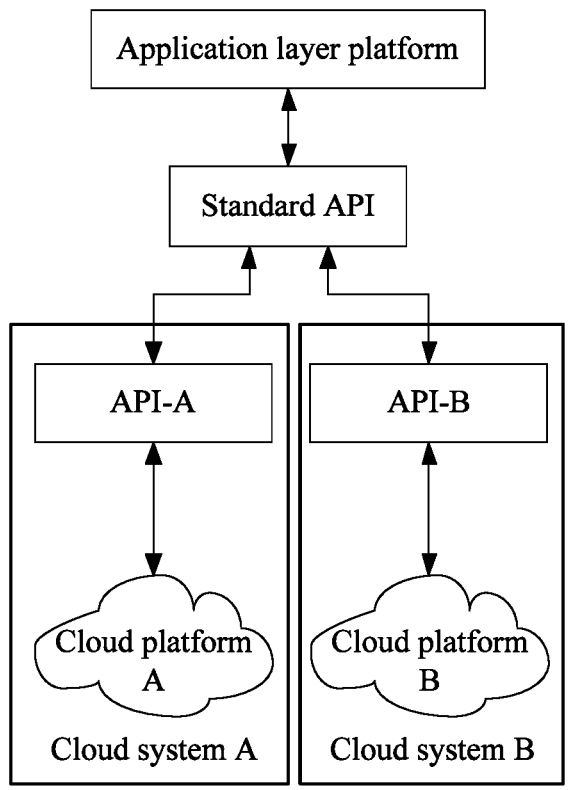
FIG. 2 is a schematic diagram of a system framework of a hybrid cloud according to an embodiment of this application.

This application provides a new hybrid cloud. Referring to FIG. 2, FIG. 2 is a schematic diagram of a system framework of a hybrid cloud according to an embodiment of this application. As shown in FIG. 2, the hybrid cloud includes a standard application programming interface API, a cloud system A and a cloud system B. Because the standard application programming interface API is simultaneously connected to an application programming interface API-A corresponding to the cloud system A and an application programming interface API-B corresponding to the cloud system B, there is a particular association relationship between the cloud system A and the cloud system B. Based on this, when a user needs to invoke, by using an application layer platform, interfaces of a cloud platform A and a cloud platform B to process user business, the interfaces of the cloud platform A and the cloud platform B may be uniformly invoked by invoking the standard application programming interface API.

Based on the hybrid cloud system shown in FIG. 2, an embodiment of this application provides an interface invocation method for a hybrid cloud that can unify an interface invocation of the hybrid cloud, thereby making system application and maintenance of the hybrid cloud more convenient. An execution subject of the interface invocation method for a hybrid cloud in the embodiment of this application may be a background server. The background server may be a background server of the standard application programming interface API.

Figure 3:
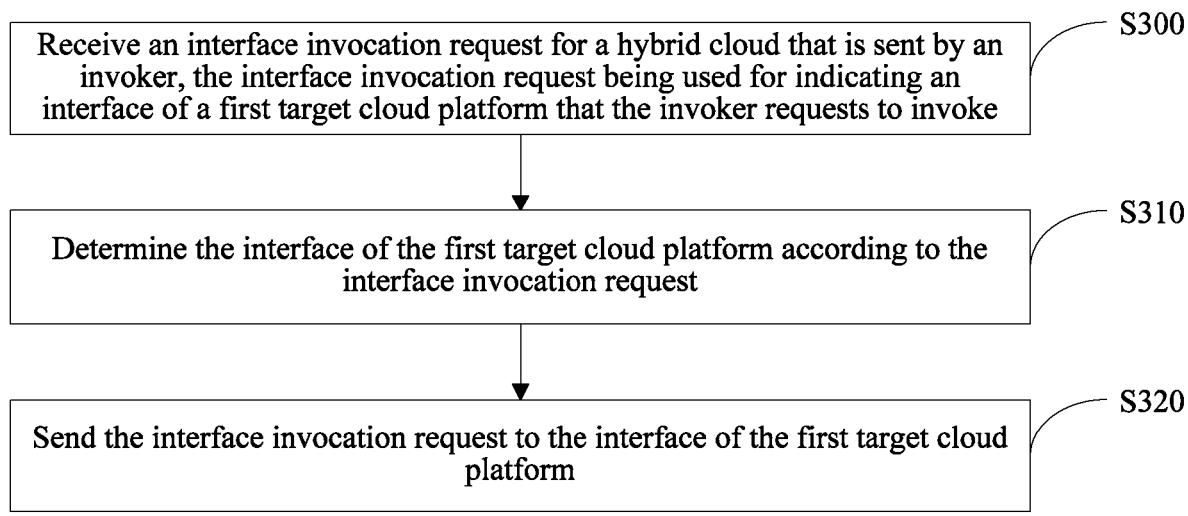
FIG. 3 is a flow chart of an interface invocation method for a hybrid cloud according to an embodiment of this application.

Referring to FIG. 3, FIG. 3 is a flow chart of an interface invocation method for a hybrid cloud performed by a computing system as described in this application according to an embodiment of this application. Referring to FIG. 3, the method may include:

Step S300: Receive an interface invocation request for a hybrid cloud that is sent by an invoker, the interface invocation request being used for indicating an interface of a first target cloud platform that the invoker requests to invoke.

It should be noted that the invoker may be a background server of the application layer platform. The interface of the target cloud platform may be an application programming interface (API) corresponding to different functions (for example, resource scheduling, resource monitoring, resource storage, resource management, analytics, and/or other resources) of the cloud platform, which is not limited in this embodiment.

Step S310: Determine the interface of the first target cloud platform according to the interface invocation request.

The interface invocation request for the hybrid cloud may carry some parameters related to the interface of the first target cloud platform. The interface of the target cloud platform may be determined by using the parameters. The following embodiment describes the specifics in detail.

Step S320: Send the interface invocation request to the interface of the first target cloud platform.

The interface invocation method for a hybrid cloud in the embodiment of the present disclosure includes: receiving an interface invocation request for a hybrid cloud that is sent by an invoker, the interface invocation request being used for indicating an interface of a first target cloud platform that the invoker requests to invoke; determining the interface of the first target cloud platform according to the interface invocation request; and sending the interface invocation request to the interface of the first target cloud platform. The foregoing interface invocation method can unify an interface invocation of the hybrid cloud, thereby making system application and maintenance of the hybrid cloud more convenient.

In some embodiments, in response to the sending the interface request to the interface of the first target platform, a response is received from the interface of the first target cloud platform.

Figure 4:
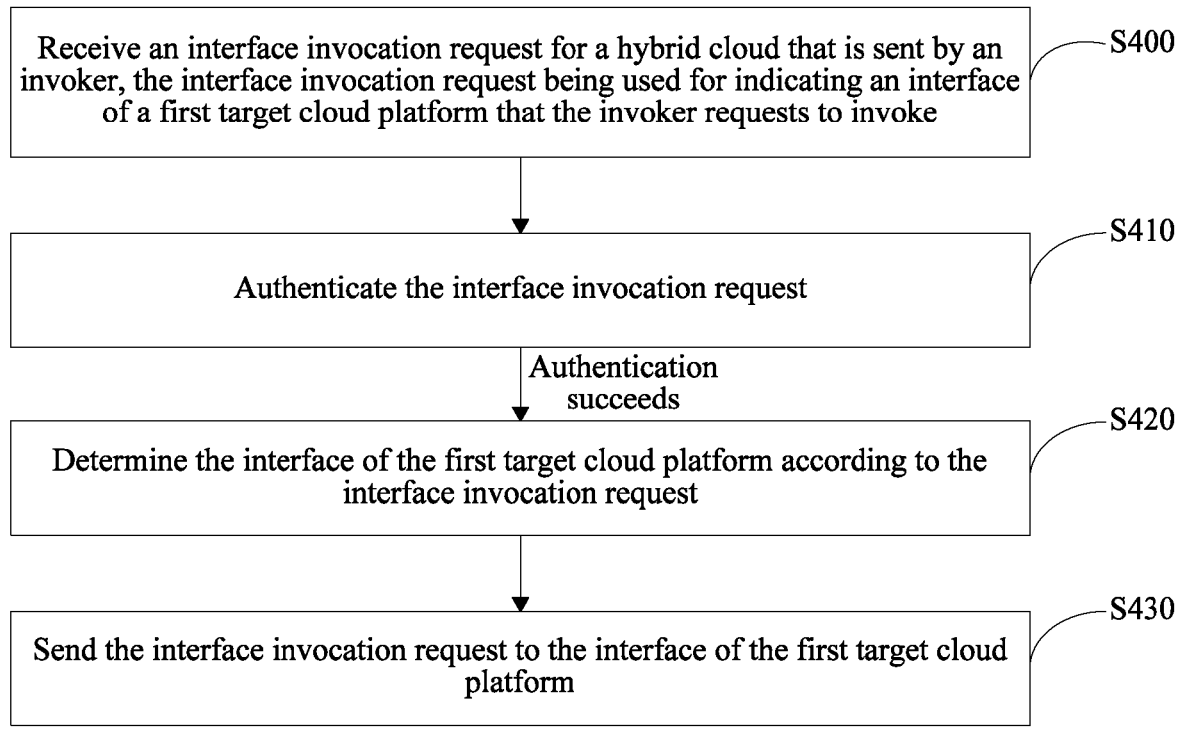
FIG. 4 is a flow chart of another interface invocation method for a hybrid cloud according to an embodiment of this application.

FIG. 4 is a flow chart of another interface invocation method for a hybrid cloud according to an embodiment of this application. Referring to FIG. 4, the method may include:

Step S400: Receive an interface invocation request for a hybrid cloud that is sent by an invoker, the interface invocation request being used for indicating an interface of a first target cloud platform that the invoker requests to invoke.

Specifically, in this embodiment, an interface invocation request including a uniform resource locator (URL) address that is sent by an invoker may be received.

Step S410: Authenticate the interface invocation request. If the authentication succeeds, perform step S420 to step S430; and if the authentication does not succeed, end the whole procedure.

To ensure invocation safety (e.g., security) of the foregoing standard API, an embodiment of this application further discloses an interface invocation request authentication method. The specifics are described below.

The invoker needs to apply an account to a background server of the standard application programming interface API in advance. In some embodiments, the account includes at least two parameters, namely, an AccessKey and a SecretKey. The AccessKey is used for identifying an identity of the invoker, and the SecretKey is a secret key used for encrypting a signature character string and verifying the signature character string at the background server of the standard API.

In this embodiment, the invoker may send an interface invocation request generated based on AN HTTP (hypertext transfer protocol) to the standard API, to implement resource scheduling of the hybrid cloud. The interface invocation request includes a request type (HTTP Method, for example, GET/POST/PATCH/PUT/DELETE) and a URL (uniform resource locator) address. In some embodiments, the standard API is a RESTful API that uses HTTP requests to GET, POST, PATCH, PUT, and DELETE data. These correspond to read (or retrieve), create, modify, update, and delete operations, respectively. In some embodiments, the standard API uses secure, encrypted communication protocols such as HTTP Secure (HTTPS) and Secure Sockets Layer (SSL). Because the hybrid cloud includes various different types of cloud platforms, a type of the first target cloud platform that the HTTP requests to invoke may be represented by adding a cloud type parameter in the URL address. For example, a tocloud represents that a type of the first target cloud platform that the HTTP requests to invoke is an Openstack cloud platform, a tacloud represents that a type of the first target cloud platform that the HTTP requests to invoke is an AWS, and a tqcloud represents that a type of the first target cloud platform that the HTTP requests to invoke is a Qcloud. In some embodiments, a cloud type includes any of a public cloud, a hybrid cloud, and a private cloud. In some embodiments, each target cloud platform has its own unique cloud type parameter. In some embodiments, the cloud type parameter may provide an indication of the cloud type. In addition, because target cloud platforms of a same type possibly include interfaces of a plurality of different regions (namely, equipment rooms), a region of an interface of the first target cloud platform that the HTTP requests to invoke may be represented by adding a region parameter in the URL address. For example, region-002 represents an interface of a second region. For example, an HTTP request GET http://api.cloud.com/v1.0/tacloud/servers? region=region-002 represents the invoker wants to invoke a read operation on an interface of a second region of a cloud platform of an AWS type. To this effect, HTTP GET requests can be sent to different target cloud platforms having different cloud type parameters to invoke read operations on the different target cloud platforms. Along the same vein, the other operations (e.g., create, modify, update, and delete operations) can also be invoked across different cloud types having different cloud parameters.

When the invoker sends the interface invocation request to the standard API, an HTTP Header that stores public parameters as shown in Table 1 needs to be simultaneously sent to the standard API. A Signature is a signature string obtained by encoding by using Base64 after signing, based on a message authentication code (e.g., a HMAC-SHA1 algorithm) and by using a key parameter SecretKey corresponding to a user authentication code AccessKey, a character string including a request type HTTP Method, a timestamp parameter Timestamp, a URL address, a platform authentication code AppKey, and a user authentication code AccessKey.

TABLE 1

| Mame | Type | Description | Mandatory |
| --- | --- | --- | --- |
| Timestamp | UInt | Current UNIX timestamp | Yes |
| AppKey | String | Platform authentication code, used for authenticating validity of platform access | Yes |
| AccessKey | String | User authentication code, used for authenticating user validity, and an AccessKey identifying an identity and a SecretKey that applied on the platform, where the SecretKey is used for generating a Signature | Yes |
| Signature | String | Request signature, used for authenticating validity of the request | Yes |

For example, parameter values of an AccessKey and a SecretKey included in an account applied by the invoker to the background server of the standard API in advance are respectively as follows:

AccessKey: AKIAIOSFODNN7EXAMPLE; and
SecretKey: wJalrXUtnFEMIK7MDENGbPxRfiCYEXAMPLEKEY.

The interface invocation request sent to the standard API by the invoker is:

GET http://api.cloud.com/v1.0/openstack-0001/servers?name=my_server.

Parameter values of a Timestamp and an AppKey are respectively as follows:

Timestamp: 1462333570; and
AppKey: APP-001.

Hex=e360a54f95c81dc5fc28d667a19fe0d11f1b0d33 is obtained by using the HMAC-SHA1 algorithm and wJalrXUtnFEMIK7MDENGbPxRfiCYEXAMPLEKEY signature on a character string 'GET'+'1462333570' +http://api.cloud.com/v1.0/openstack-0001/servers?name=my_server'+'APP-001'+'AKIAIOSFODNN7EXAMPLE', and Signature=42C1T5XIHcX8KNZnoZ/g0R8bDTM may be obtained by encoding the hex by using the Base64.

Therefore, the interface invocation request sent to the standard API by the invoker is as follows:
GET http://api.cloud.com/v1.0/openstack-0001/servers?name=my_server.

The HTTP Header sent to the standard API by the invoker is as follows:

| | |
|---|---|
| Timestamp | 1462333570 |
| AppKey | APP-001 |
| AccessKey | AKIAIOSFODNN7EXAMPLE |
| Signature | 42CIT5XIHcX8KNZnoZ/g0R8bDTM |

The standard API transmits a received interface invocation request and HTTP Header to the background server of the standard API. The background server queries a database to obtain a parameter SecretKey preallocated to the invoker, and authenticates a Signature by using the parameter. If each value in a character string including an HTTP Method, a Timestamp, a URL, an AppKey and an AccessKey obtained after the authentication is completely consistent with each value in the interface invocation request and the HTTP Header that are received by the standard API, it is determined that the authentication succeeds. That is, the invoker can invoke the standard API. If each value in a character string including an HTTP Method, a Timestamp, a URL, an AppKey and an AccessKey obtained after the authentication is not completely consistent with each value in the interface invocation request and the HTTP Header that are received by the standard API, it is determined that the authentication does not succeed. That is, the invoker cannot invoke the standard API.

Step S420: Determine the interface of the first target cloud platform according to the interface invocation request.

In step, the interface of the first target cloud platform may be determined by using the following method: determining the type of the first target cloud platform according to a cloud platform type parameter in the URL address; determining the region of the interface of the first target cloud platform according to the region parameter in the URL address; and determining an interface within the region as the interface of the first target cloud platform according to the type of the first target cloud platform and the region of the interface of the first target cloud platform.

Step S430: Send the interface invocation request to the interface of the first target cloud platform.

In this embodiment, the foregoing authentication manner is added, so as to ensure a valid user to successfully schedule the standard API, and an invalid user cannot successfully schedule the standard API, thereby ensuring scheduling security of a resource of the hybrid cloud.

An application example of an interface invocation method for a hybrid cloud according to an embodiment of this application may be as follows:

Using that a hybrid cloud to be scheduled by a user A by using an application layer includes a cloud platform A, a cloud platform B and a cloud platform C as an example, the cloud platform A, the cloud platform B and the cloud platform C having respective corresponding application programming interfaces API-A, API-B and API-C. In some embodiments, each of the cloud platforms A, B, and C can be a public cloud, a private cloud, or a hybrid cloud. For example, a type of the cloud platform A is the Openstack cloud platform, a region of an equipment room is North China, the cloud platform A includes cloud servers a1, a2 and a3, and a resource scheduling API corresponding to the cloud platform A is an API-A. As a second example, a type of the cloud platform B is the AWS, a region of an equipment room is South China, the cloud platform B includes cloud servers b1, b2 and b3, and a resource scheduling API corresponding to the cloud platform B is an API-B. As a third example, a type of the cloud platform C is the Qcloud, a region of an equipment room is central China, the cloud platform C includes cloud servers c1, c2 and c3, and a resource scheduling API corresponding to the cloud platform C is an API-C.

Figure 5:
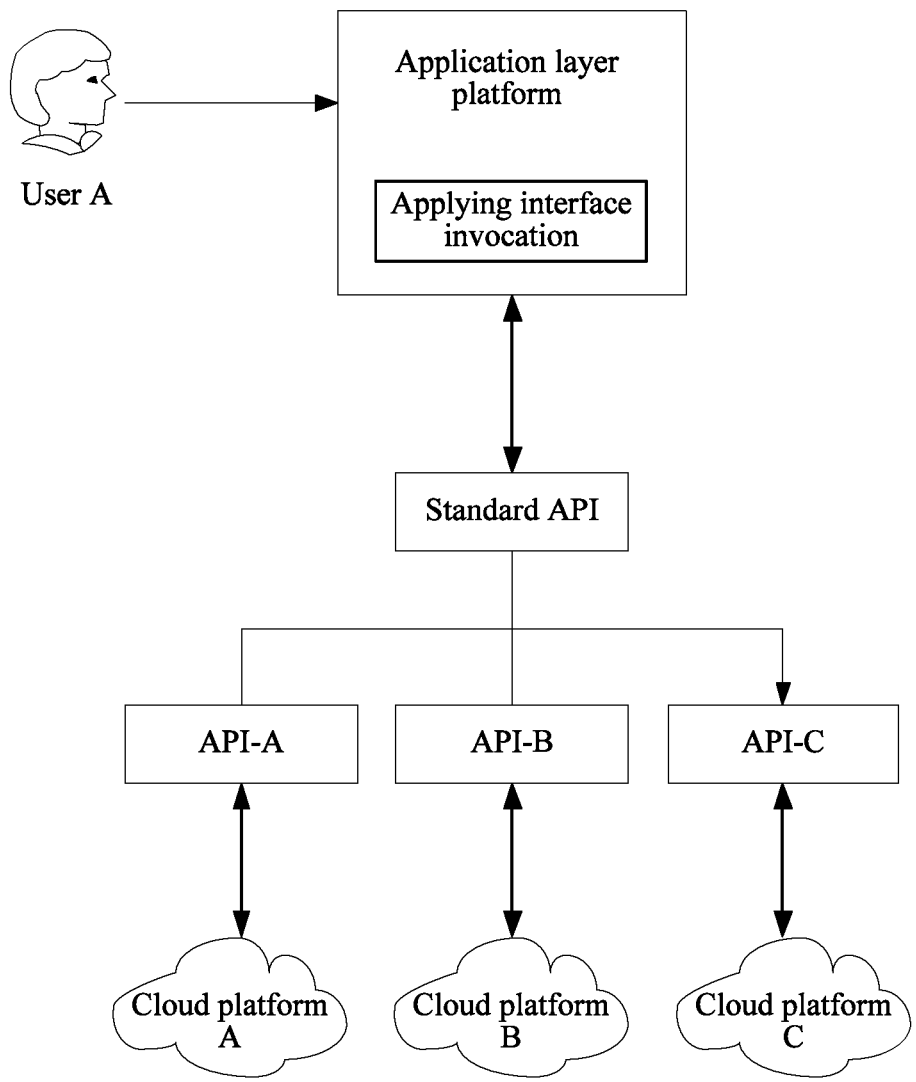
FIG. 5 is a schematic diagram of an application example of an interface invocation method for a hybrid cloud according to an embodiment of this application.

Referring to FIG. 5, an application layer platform provides an interface invocation application interface. The user A triggers an application interface invocation button on the interface invocation application interface, to generate an interface invocation request for a hybrid cloud. For example, the interface invocation request is specifically GTE http://api.cloud.com/v1.0/tocloud/servers? region=region-001, used for instructing to schedule resources of the cloud servers a1, a2 and a3. After the application layer platform obtains the foregoing interface invocation request, the application layer platform sends the interface invocation request to a background server corresponding to a standard API, the background server corresponding to the standard API determines an interface of a target cloud platform corresponding to the interface invocation request is an API-A. The background server corresponding to the standard API sends the interface invocation request for the hybrid cloud to the cloud platform A by using the API-A. The cloud platform A schedules a resource thereof, obtains a corresponding resource scheduling result, and feeds back the resource scheduling result to a background server of the application layer platform by using the API-A and the standard API in sequence. The background server of the application layer platform displays the resource scheduling result to the user A by using the interface invocation application interface.

The following describes an interface invocation apparatus for a hybrid cloud in an embodiment of this application. Cross-reference may be made between the interface invocation apparatus for a hybrid cloud described below and the foregoing interface invocation method for a hybrid cloud.

Figure 6:
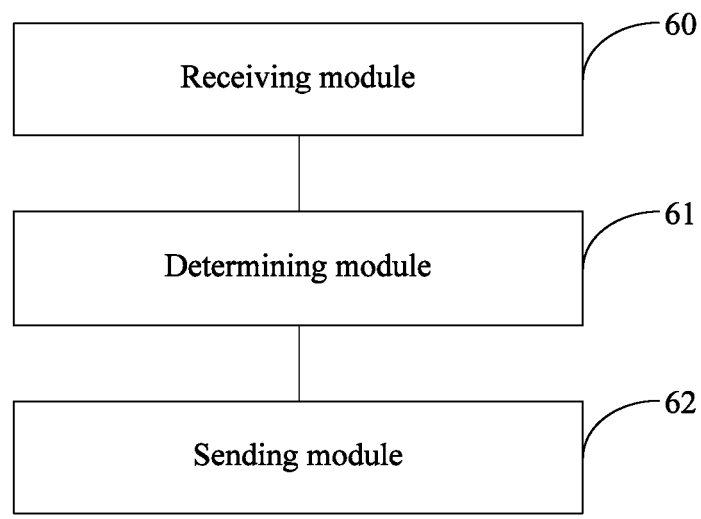
FIG. 6 is a structural block diagram of an interface invocation apparatus for a hybrid cloud according to an embodiment of this application.

FIG. 6 is a structural block diagram of an interface invocation apparatus for a hybrid cloud according to an embodiment of this application. The interface invocation apparatus for a hybrid cloud may specifically be a background server. Referring to FIG. 6, the interface invocation apparatus for a hybrid cloud may include:

a receiving module 60, configured to receive an interface invocation request for a hybrid cloud that is sent by an invoker, the interface invocation request being used for indicating an interface of a first target cloud platform that the invoker requests to invoke;

a determining module 61, configured to determine the interface of the first target cloud platform according to the interface invocation request; and a sending module 62, configured to send the interface invocation request to the interface of the first target cloud platform.

Figure 7:
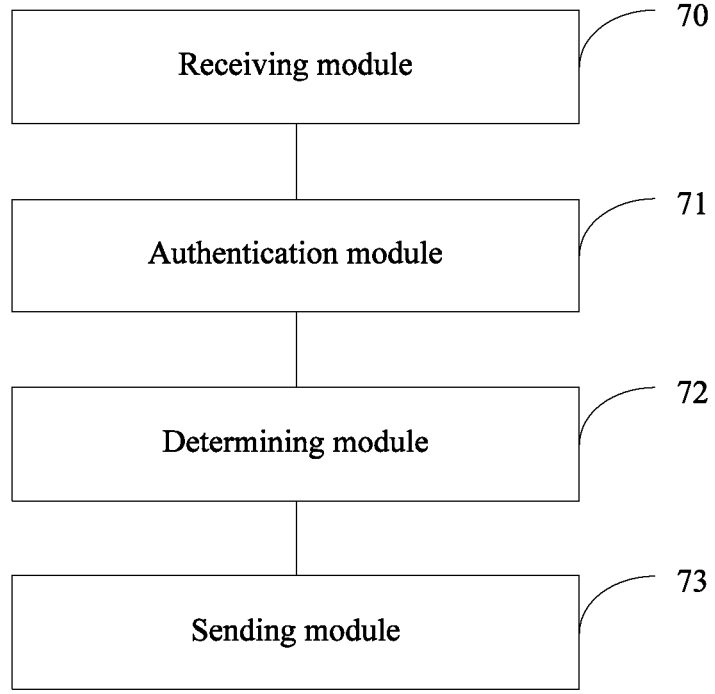
FIG. 7 is another structural block diagram of an interface invocation apparatus for a hybrid cloud according to an embodiment of this application.

FIG. 7 is another structural block diagram of an interface invocation apparatus for a hybrid cloud according to an embodiment of this application. The interface invocation apparatus for a hybrid cloud may specifically be a background server. Referring to FIG. 7, the interface invocation apparatus for a hybrid cloud may include:

a receiving module 70, configured to receive an interface invocation request for a hybrid cloud that is sent by an invoker, the interface invocation request being used for indicating an interface of a first target cloud platform that the invoker requests to invoke;

an authentication module 71, configured to attempt to authenticate the interface invocation request before the interface of the first target cloud platform is determined according to the interface invocation request; and trigger the determining module 72 to determine the interface of the first target cloud platform according to the interface invocation request if the authentication succeeds;

a determining module 72, configured to determine the interface of the first target cloud platform according to the interface invocation request; and a sending module 73, configured to send the interface invocation request to the interface of the first target cloud platform.

In an implementation, the receiving module is also configured to:

receive an interface invocation request including a uniform resource locator URL address that is sent by an invoker.

In some embodiments, the receiving module is further configured to receive a response form the interface of target cloud platforms.

Figure 8:
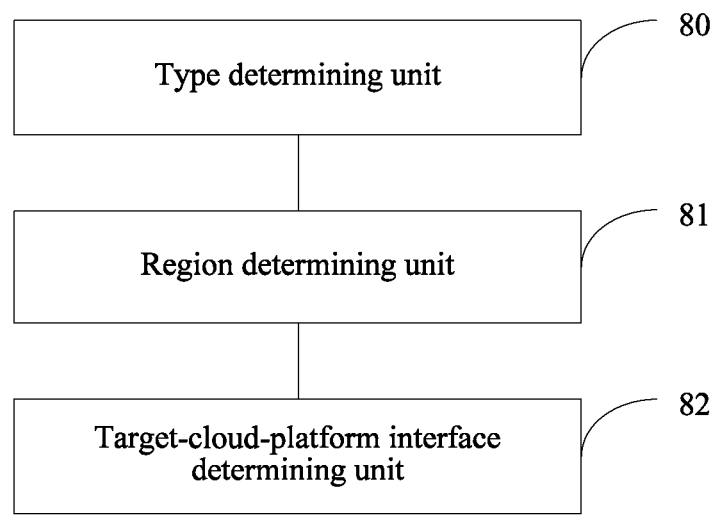
FIG. 8 is a structural diagram of a determining module according to an embodiment of this application.

In an implementation, FIG. 8 is a structural diagram of a determining module. Referring to FIG. 8, the determining module specifically includes:

a type determining unit 80, configured to determine a type of the first target cloud platform according to a cloud platform type parameter in the URL address;

a region determining unit 81, configured to determine a region of the interface of the first target cloud platform according to a region parameter in the URL address; and a target-cloud-platform interface determining unit 82, configured to determine an interface within the region as the interface of the first target cloud platform.

Figure 9:
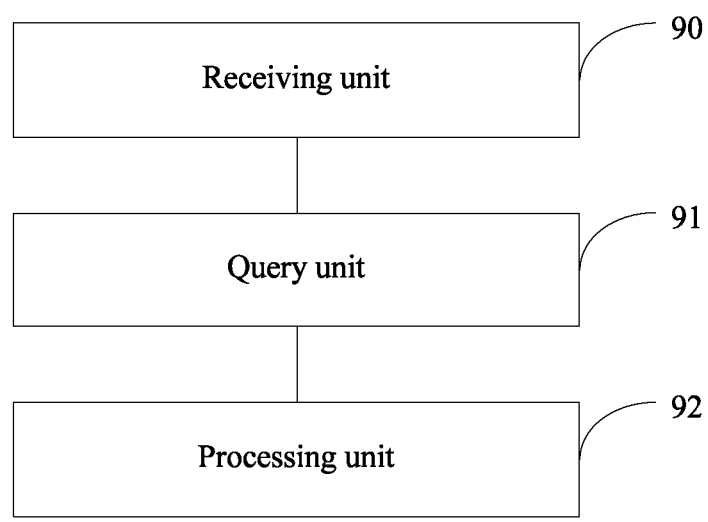
FIG. 9 is a structural diagram of an authentication module according to an embodiment of this application.

In an implementation, FIG. 9 is a structural diagram of an authentication module. Referring to FIG. 9, the authentication module specifically includes:

a receiving unit 90, configured to receive an HTTP header sent by the invoker, the HTTP header including a timestamp parameter Timestamp, a platform authentication code AppKey, a user authentication code AccessKey, and a signature string Signature;

a query unit 91, configured to obtain a key parameter SecretKey preallocated to the invoker; and a processing unit 92, configured to attempt to authenticate the signature string Signature by using the key parameter SecretKey, and obtaining a character string including an HTTP Method, a Timestamp, a URL address, an AppKey, and an AccessKey; and determine that the authentication succeeds when the HTTP Method in the character string is consistent with the request type in the interface invocation request, the URL address in the character string is consistent with the URL address in the interface invocation request, the Timestamp in the character string is consistent with the Timestamp in the HTTP header, the AppKey in the character string is consistent with the AppKey in the HTTP header, and the AccessKey in the character string is consistent with the AccessKey in the HTTP header.

Figure 10:
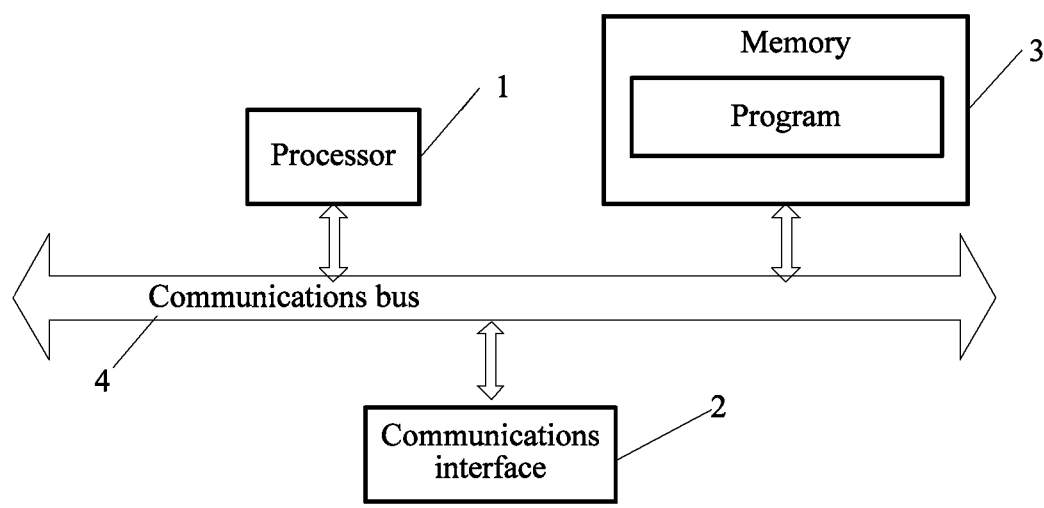
FIG. 10 is a structural block diagram of hardware of an interface invocation apparatus for a hybrid cloud according to an embodiment of this application.

In an implementation, the interface invocation apparatus for a hybrid cloud may be a hardware device, may alternatively be software, and may alternatively be hardware instruction software. The foregoing modules and units may be disposed in a functional module in the interface invocation apparatus for a hybrid cloud. FIG. 10 is a structural block diagram of hardware of an interface invocation apparatus for a hybrid cloud. Referring to FIG. 10, the interface invocation apparatus for a hybrid cloud may include: one or more processors 1, a communications interface 2, a memory 3 and a communications bus 4. The one or more processors 1, the communications interface 2 and the memory 3 communicate with each other by using the communications bus 4. The communications interface 2 may be an interface of a communication module, for example, an interface of a GSM module.

The processor 1 is configured to execute a program. The memory 3 is configured to store a program. The program may include program code, and the program code includes a computer operation instruction.

The processor 1 may be a central processing unit (CPU) or an application specific integrated circuit (ASIC) or may be configured as one or more integrated circuits for implementing the embodiments of this application. The memory 3 may include a high-speed RAM memory, and may also include a non-volatile memory, for example, at least one magnetic disk memory (i.e., a non-transitory computer readable storage medium).

The program may be specifically used for:

receiving an interface invocation request for a hybrid cloud that is sent by an invoker, the interface invocation request being used for indicating an interface of a first target cloud platform that the invoker requests to invoke;

determining the interface of the first target cloud platform according to the interface invocation request; and sending the interface invocation request to the interface of the first target cloud platform.

Figure 11:
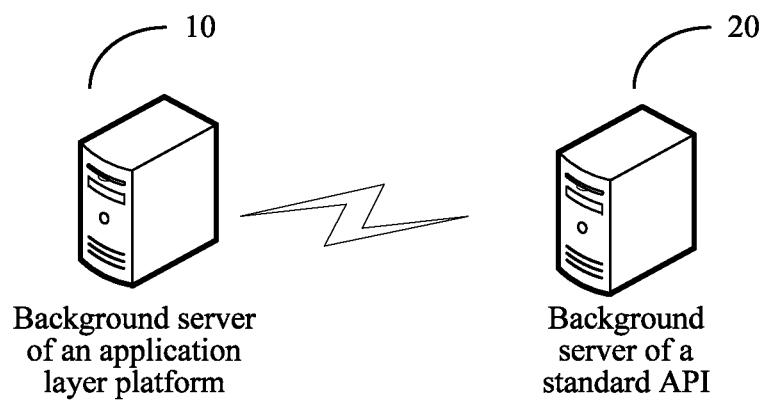
FIG. 11 is a structural diagram of an interface invocation system for a hybrid cloud according to an embodiment of this application.

The following describes an interface invocation system for a hybrid cloud according to the present disclosure. A structural diagram of the interface invocation system for a hybrid cloud is as shown in FIG. 11. The interface invocation system for a hybrid cloud includes a background server 10 of an application layer platform and a background server 20 of a standard API.

The background server of the application layer platform is configured to receive an interface invocation request for a hybrid cloud that is sent by a user and to send the interface invocation request to the background server of the standard API. The interface invocation request is used for indicating an interface of a first target cloud platform that the invoker requests to invoke.

The background server of the standard API is configured to receive the interface invocation request sent by the background server of the application layer platform, to determine the interface of the first target cloud platform according to the interface invocation request, and to send the interface invocation request to the interface of the first target cloud platform.

In an implementation, the background server of the standard API is further configured to attempt to authenticate the interface invocation request before the interface of the first target cloud platform is determined according to the interface invocation request; and determine the interface of the first target cloud platform according to the interface invocation request if the authentication succeeds.

In an implementation, the background server of the standard API is specifically configured to receive an interface invocation request including a uniform resource locator URL address that is sent by the background server of the application layer platform.

In an implementation, the background server of the standard API is specifically configured to:

determine a type of the first target cloud platform according to a cloud platform type parameter in the URL address;

determine a region of the interface of the first target cloud platform according to a region parameter in the URL address; and determine an interface within the region as the interface of the first target cloud platform.

The background server of the standard API is specifically configured to:

receive an HTTP header sent by the invoker, the HTTP header including a timestamp parameter Timestamp, a platform authentication code AppKey, a user authentication code AccessKey, and a signature string Signature;

obtain a key parameter SecretKey preallocated to the invoker;

attempt to authenticate the signature string Signature by using the key parameter SecretKey, and obtain a character string including a request type HTTP Method, a timestamp parameter Timestamp, a URL address, a platform authentication code AppKey, and a user authentication code AccessKey; and determine that the authentication succeeds when the request type HTTP Method in the character string is consistent with the request type in the interface invocation request, the URL address in the character string is consistent with the URL address in the interface invocation request, the timestamp parameter Timestamp in the character string is consistent with the timestamp parameter Timestamp in the HTTP header, the platform authentication code AppKey in the character string is consistent with the platform authentication code AppKey in the HTTP header, and the user authentication code AccessKey in the character string is consistent with the user authentication code AccessKey in the HTTP header.

In addition, an embodiment of this application further provides a resource monitoring method for a hybrid cloud, so as to uniformly monitor a resource of the hybrid cloud, and improve efficiency of resource monitoring of the hybrid cloud. An execution subject of the resource monitoring method for a hybrid cloud in the embodiment of this application may be a background server.

The background server may be a server corresponding to a cloud service self-help platform. The server has a common cloud service function, and further records a resource information table generated when the hybrid cloud is created. After receiving a resource monitoring request for the hybrid cloud, the background server determines at least one second target cloud platform of the hybrid cloud according to the resource monitoring request for the hybrid cloud, and establishes a signal path between the server and each second target cloud platform to uniformly control each second target cloud platform to obtain resource monitoring data thereof, thereby obtaining resource monitoring data of the hybrid cloud.

The background server may alternatively be a server of a standard application programming interface API. The server of the standard records a resource information table generated when the hybrid cloud is created. After receiving a resource monitoring request for the hybrid cloud sent by a user by using a cloud service self-help platform, the server determines at least one second target cloud platform of the hybrid cloud according to the resource monitoring request for the hybrid cloud, establishes a signal path between the server and each second target cloud platform to uniformly control each second target cloud platform to obtain resource monitoring data thereof, thereby obtaining resource monitoring data of the hybrid cloud, and feeds back the obtained resource monitoring data of the hybrid cloud to the cloud service self-help platform, to display the data to the user.

Specifically, a resource monitoring method for a hybrid cloud according to an embodiment of this application includes:

receiving a resource monitoring request for the hybrid cloud, the resource monitoring request being used for requesting to obtain resource monitoring data of the hybrid cloud;

determining a second target cloud platform of the hybrid cloud according to the resource monitoring request;

sending, to the second target cloud platform, a resource monitoring request for the second target cloud platform, the resource monitoring request for the second target cloud platform being used for requesting to obtain resource monitoring data of the second target cloud platform; and receiving the resource monitoring data fed back by the second target cloud platform.

Figure 12:
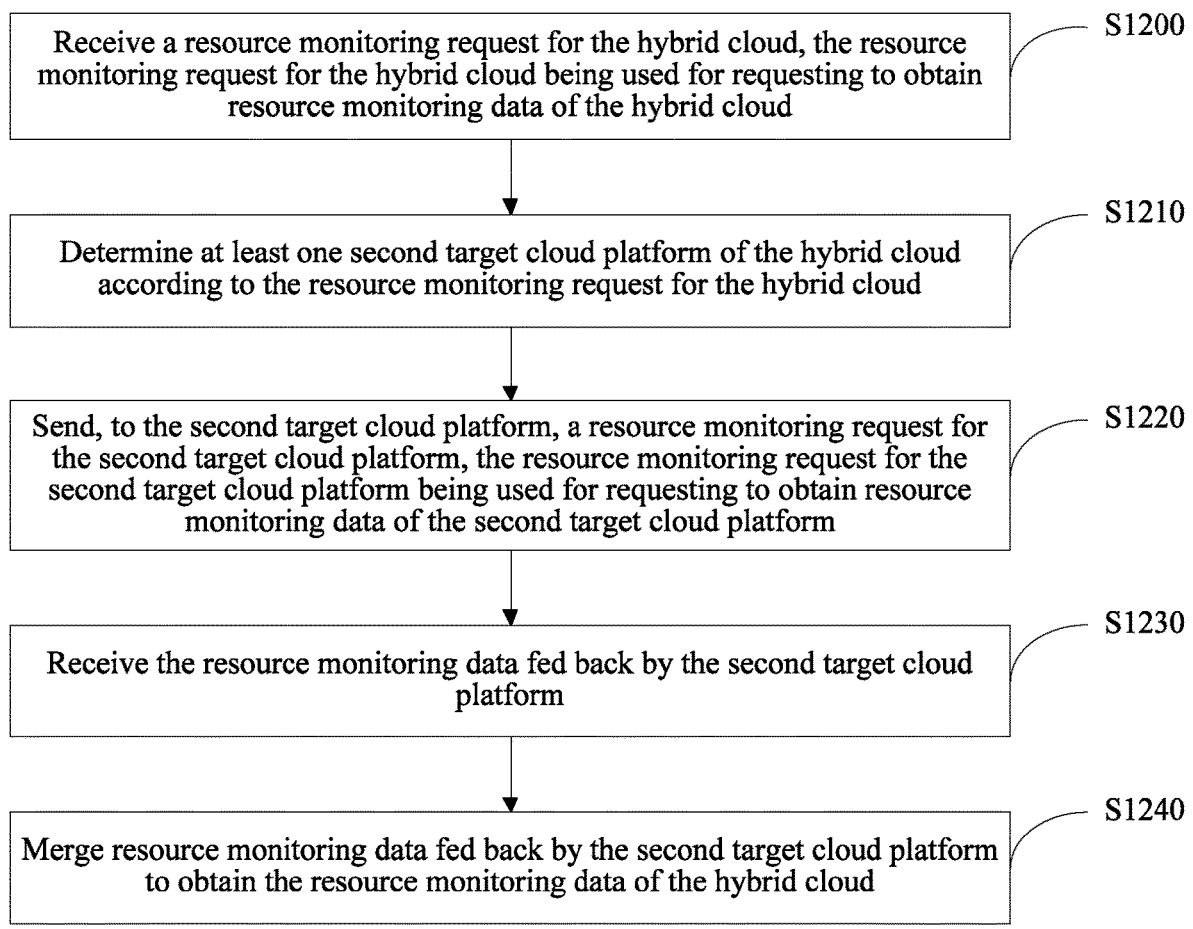
FIG. 12 is a flow chart of a resource monitoring method for a hybrid cloud according to an embodiment of this application.

Referring to FIG. 12, FIG. 12 is a flow chart of a resource monitoring method for a hybrid cloud according to an embodiment of this application. Referring to FIG. 12, the method may include:

Step S1200: Receive a resource monitoring request for the hybrid cloud, the resource monitoring request for the hybrid cloud being used for requesting to obtain resource monitoring data of the hybrid cloud.

In this embodiment, the resource monitoring request for the hybrid cloud may be sent by a user by using a cloud service self-help platform, is intended to obtain the resource monitoring data of the hybrid cloud to learn a running condition of the hybrid cloud, and proposes a countermeasure in time according to the running condition of the hybrid cloud.

In this embodiment, a plurality of resource monitoring data of the hybrid cloud may be obtained. Specifically, a monitoring request on any one or more of a central processing unit CPU resource of a cloud server, a memory resource of a cloud server, an intranet bandwidth resource of a cloud server, or a magnetic disk resource of a cloud server in the hybrid cloud may be received. The central processing unit CPU resource of the cloud server includes CPU utilization and a CPU average load; the memory resource of the cloud server includes memory usage and memory utilization; the intranet bandwidth resource of the cloud server includes outbound bandwidth, inbound bandwidth, an out package volume and an in package volume; and the magnetic disk resource of the cloud server includes magnetic disk reading utilization and magnetic disk writing utilization.

Step S1210: Determine a second target cloud platform of the hybrid cloud according to the resource monitoring request for the hybrid cloud.

The resource monitoring request for the hybrid cloud includes instance ID information of each cloud server in the hybrid cloud. In an implementation, a second target cloud platform of the hybrid cloud may be determined according to the instance ID information of each cloud server in the hybrid cloud. A specific method is described in detail by using the following embodiment.

Step S1220: Send, to the determined second target cloud platform, a resource monitoring request for the second target cloud platform, the resource monitoring request for the second target cloud platform being used for requesting to obtain resource monitoring data of the second target cloud platform.

When a to-be-monitored resource of the hybrid cloud is determined to include resources of a plurality of second target cloud platforms. In this embodiment, by using the foregoing steps, a resource monitoring request for the hybrid cloud may be divided into resource monitoring requests for the plurality of second target cloud platforms, and the resource monitoring requests for the plurality of second target cloud platforms are respectively sent to corresponding second target cloud platforms, so that the plurality of second target cloud platforms synchronously obtain resource monitoring data thereof.

Step S1230: Receive the resource monitoring data fed back by the second target cloud platform.

After the second target cloud platform synchronously obtains resource monitoring data thereof, the second target cloud platform feeds back the obtained resource monitoring data to a background server.

Step S1240: Merge resource monitoring data fed back by the second target cloud platform to obtain the resource monitoring data of the hybrid cloud.

After the background server receives the resource monitoring data fed back by the second target cloud platform, resource monitoring data fed back by the second target cloud platform may be merged to obtain the resource monitoring data of the hybrid cloud.

It should be noted that specifically, merging mentioned in this embodiment may be merging resource monitoring data fed back by the second target cloud platform into resource monitoring data used for representing the running condition of the hybrid cloud.

In an implementation, after obtaining resource monitoring data of a hybrid cloud, the resource monitoring data of the hybrid cloud may further be displayed.

The resource monitoring method for a hybrid cloud in the embodiment of the present disclosure includes: receiving a resource monitoring request for the hybrid cloud, the resource monitoring request for the hybrid cloud being used for requesting to obtain resource monitoring data of the hybrid cloud; determining at least one second target cloud platform of the hybrid cloud according to the resource monitoring request for the hybrid cloud; sending, to the determined second target cloud platform, a resource monitoring request for the second target cloud platform, the resource monitoring request for the second target cloud platform being used for requesting to obtain resource monitoring data of the second target cloud platform; receiving the resource monitoring data fed back by the second target cloud platform; and merging resource monitoring data fed back by the second target cloud platform to obtain the resource monitoring data of the hybrid cloud. Based on the foregoing method, the resource of the hybrid cloud can be uniformly monitored, and further improves efficiency of resource monitoring of the hybrid cloud.

Figure 13:
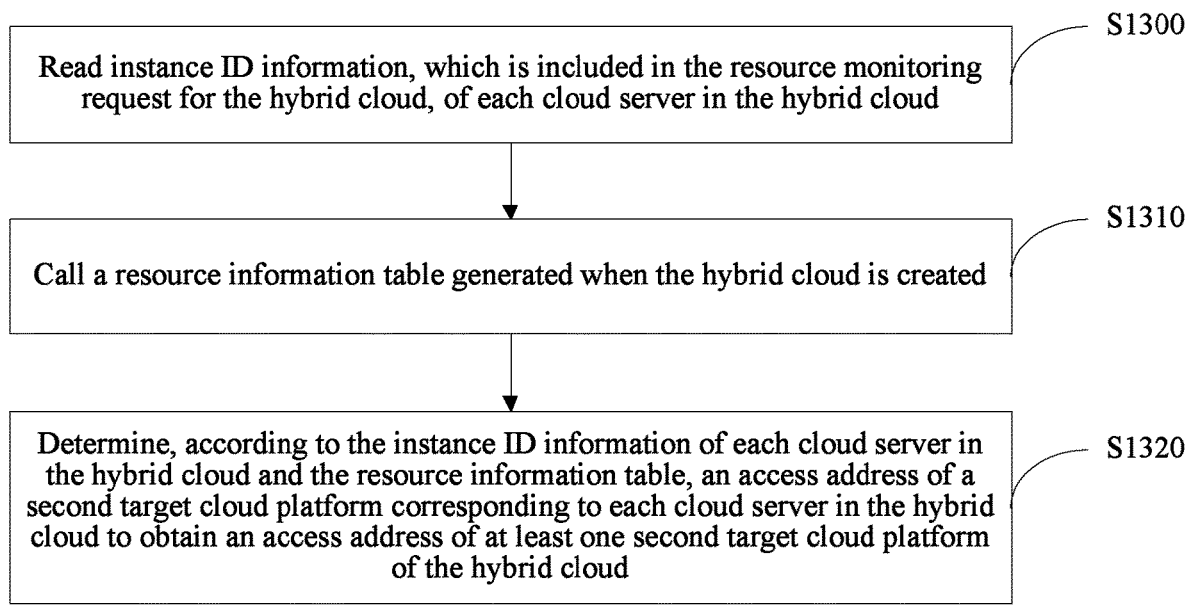
FIG. 13 is a flow chart of a method for determining a second target cloud platform of the hybrid cloud according to the resource monitoring request for the hybrid cloud according to an embodiment of this application.
Figure 14:
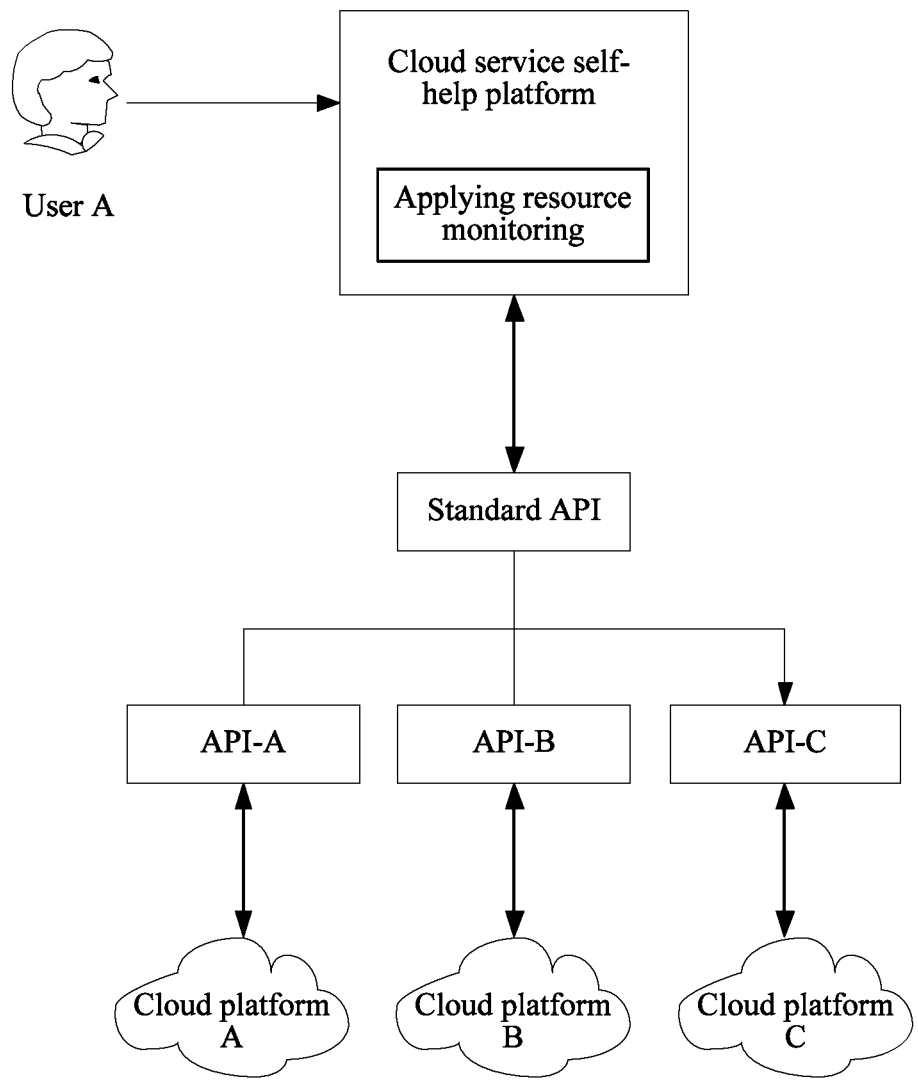
FIG. 14 is a schematic diagram of an application example of a resource monitoring method for a hybrid cloud according to an embodiment of this application.

FIG. 13 is a flow chart of a method for determining at least one second target cloud platform of the hybrid cloud according to the resource monitoring request for the hybrid cloud according to an embodiment of this application. Referring to FIG. 13, the method may include:

Step S1300: Read instance ID information, which is included in the resource monitoring request for the hybrid cloud, of each cloud server in the hybrid cloud.

Step S1310: Call a resource information table generated when the hybrid cloud is created.

After the hybrid cloud is successfully created, a resource information table is stored in a background server. In this embodiment, a resource information table generated when the hybrid cloud is created may be called to determine at least one second target cloud platform of the hybrid cloud. The specific is described below in detail.

Step S1320: Determine, according to the instance ID information of each cloud server in the hybrid cloud and the resource information table, an access address of a second target cloud platform corresponding to each cloud server in the hybrid cloud to obtain an access address of at least one second target cloud platform of the hybrid cloud.

It should be noted that the foregoing resource information table sets forth related information to a resource of the hybrid cloud, for example, the instance ID information of each cloud server in the hybrid cloud, and equipment room information corresponding to the instance ID information of each cloud server. The equipment room information includes at least an access address of a second target cloud platform corresponding to each cloud server in the hybrid cloud. In this embodiment, that an access address of a second target cloud platform corresponding to each cloud server in the hybrid cloud may be determined according to the instance ID information of each cloud server in the hybrid cloud and the resource information table may be implemented by using the following method: reading, from the resource information table, equipment room information corresponding to the instance ID information of each cloud server in the hybrid cloud, the equipment room information including the access address of the second target cloud platform corresponding to each cloud server in the hybrid cloud; and determining, according to the equipment room information corresponding to the instance ID information of each cloud server in the hybrid cloud, the access address of a second target cloud platform corresponding to each cloud server in the hybrid cloud.

After the access address of a second target cloud platform corresponding to each cloud server in the hybrid cloud is determined, in an implementation, sending a resource monitoring request for a target cloud platform to the at least one second target cloud platform including:

determining, according to the access address of the second target cloud platform corresponding to each cloud server, an application programming interface API of the second target cloud platform corresponding to each cloud server; and sending, to the second target cloud platform, a resource monitoring request for the second target cloud platform by using the application programming interface API of the second target cloud platform, the resource monitoring request for the second target cloud platform being used for requesting to obtain resource monitoring data of each cloud server corresponding to the second target cloud platform.

An application example of a resource monitoring method for a hybrid cloud according to an embodiment of the present disclosure may be as follows:

Using that a hybrid cloud to be monitored by a user A by using a cloud service self-help platform includes a cloud platform A, a cloud platform B and a cloud platform C as an example, the cloud platform A, the cloud platform B and the cloud platform C are respectively corresponding to an API-A, an API-B and an API-C. A region of an equipment room of the cloud platform A is North China, the cloud platform A includes cloud servers a1, a2 and a3, and an access address of a cloud platform corresponding to the cloud platform A is an API-A. A region of an equipment room of the cloud platform B is South China, the cloud platform B includes cloud servers b1, b2 and b3, and an access address of a cloud platform corresponding to the cloud platform B is an API-B. A region of an equipment room of the cloud platform C is central China, the cloud platform C includes cloud servers c1, c2 and c3, and an access address of a cloud platform corresponding to the cloud platform C is an API-C.

Referring to FIG. 5, a cloud service self-help platform provides a resource monitoring application interface. The user A triggers a resource monitoring button on the resource monitoring application interface, to generate a resource monitoring request for a hybrid cloud. The resource monitoring request is used for requesting to obtain memory resource monitoring data of cloud servers a1, a2, a3, b1, b2, b3, c1, c2 and c3. After the cloud service self-help platform obtains the foregoing resource monitoring request for the hybrid cloud, the cloud service self-help platform sends the resource monitoring request for the hybrid cloud to a background server corresponding to a standard API. The background server corresponding to the standard API determines, according to a resource information table stored by itself, that equipment room information corresponding to the foregoing servers a1, a2 and a3 is North China and an access address of a cloud platform corresponding to the region is the API-A, equipment room information corresponding to the foregoing servers b1, b2 and b3 is South China and an access address of a cloud platform corresponding to the region is the API-B, and equipment room information corresponding to the foregoing servers c1, c2 and c3 is central China and an access address of a cloud platform corresponding to the region is the API-C. The background server corresponding to the standard API divides the resource monitoring request for the hybrid cloud into a resource monitoring request for the cloud platform A, a resource monitoring request for the cloud platform B, and a resource monitoring request for the cloud platform C. The background server corresponding to the standard API sends the foregoing resource monitoring request for the cloud platform A to the cloud platform A by using the API-A, sends the foregoing resource monitoring request for the cloud platform B to the cloud platform B by using the API-B, and sends the foregoing resource monitoring request for the cloud platform C to the cloud platform C by using the API-C. The cloud platform A, the cloud platform B and the cloud platform C respectively monitor memory resources thereof, obtain corresponding memory resource monitoring data, and return the obtained memory resource monitoring data to the cloud service self-help platform by using the API-A, the API-B, the API-C and the standard API in sequence. The cloud service self-help platform displays the memory resource monitoring data to the user A by using an interface.

The following describes a resource monitoring apparatus for a hybrid cloud in an embodiment of the present disclosure. Cross-reference may be made between the resource monitoring apparatus for a hybrid cloud described below and the foregoing resource monitoring method for a hybrid cloud.

Figure 15:
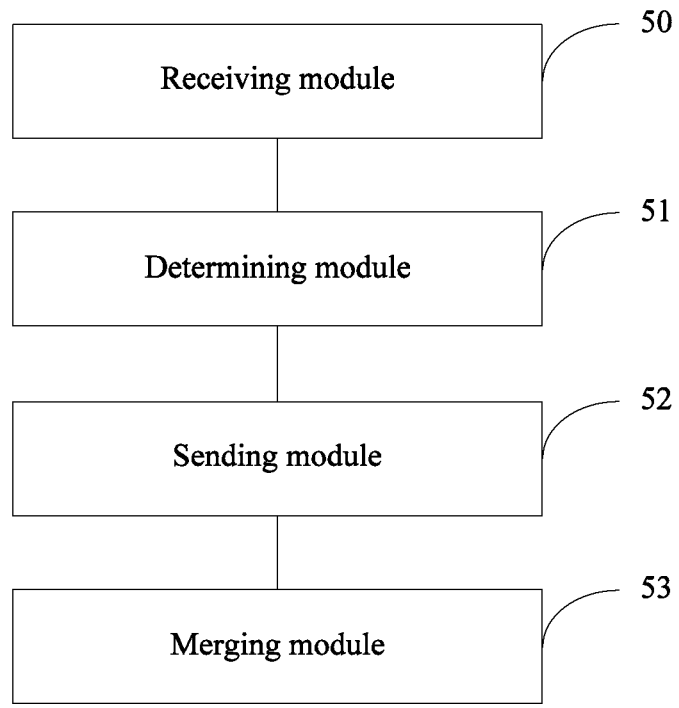
FIG. 15 is a structural block diagram of a resource monitoring system for a hybrid cloud according to an embodiment of this application.

FIG. 15 is a structural block diagram of a resource monitoring system for a hybrid cloud according to an embodiment of this application. The resource monitoring apparatus for a hybrid cloud may specifically be a background server. Referring to FIG. 15, the resource monitoring apparatus for a hybrid cloud may include:

a receiving module 50, configured to receive a resource monitoring request for the hybrid cloud, the resource monitoring request for the hybrid cloud being used for requesting to obtain resource monitoring data of the hybrid cloud;

a determining module 51, configured to determine at least one second target cloud platform of the hybrid cloud according to the resource monitoring request for the hybrid cloud;

a sending module 52, configured to send, to the determined second target cloud platform, a resource monitoring request for the second target cloud platform, the resource monitoring request for the second target cloud platform being used for requesting to obtain resource monitoring data of the second target cloud platform;

the receiving module 50, further configured to receive the resource monitoring data fed back by the second target cloud platform; and a merging module 53, configured to merge resource monitoring data fed back by the second target cloud platform to obtain the resource monitoring data of the hybrid cloud.

Figure 16:
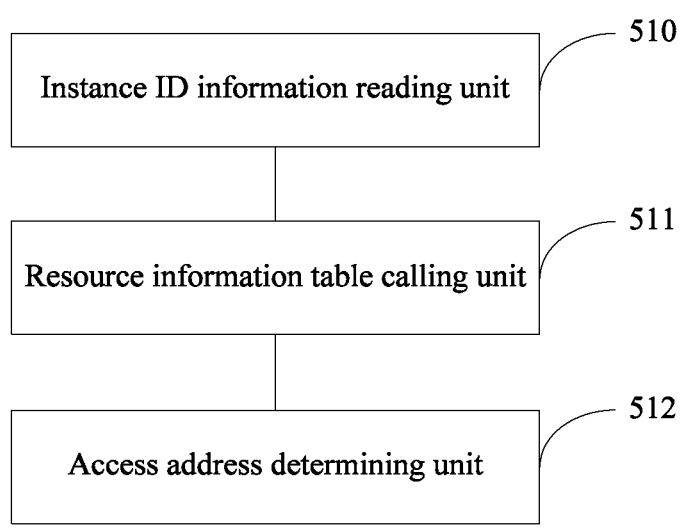
FIG. 16 is a structural diagram of a determining module according to an embodiment of this application.

In an implementation, FIG. 16 is a structural diagram of a determining module 51. The determining module 51 specifically includes:

an instance ID information reading unit 510, configured to read instance ID information of each cloud server in the hybrid cloud from the resource monitoring request for the hybrid cloud;

a resource information table calling unit 511, configured to call a resource information table generated when the hybrid cloud is created; and an access address determining unit 512, configured to determine, according to the instance ID information of each cloud server in the hybrid cloud and the resource information table, an access address of a second target cloud platform corresponding to each cloud server in the hybrid cloud to obtain an access address of at least one second target cloud platform corresponding to the hybrid cloud.

In an implementation, the access address determining unit is specifically configured to:

read, from the resource information table, equipment room information corresponding to the instance ID information of each cloud server in the hybrid cloud, the equipment room information including the access address of the second target cloud platform corresponding to each cloud server in the hybrid cloud; and determine, according to the equipment room information corresponding to the instance ID information of each cloud server in the hybrid cloud, the access address of the second target cloud platform corresponding to each cloud server in the hybrid cloud.

In an implementation, the sending module includes:

an API determining unit, configured to determine, according to the access address of the second target cloud platform corresponding to each cloud server, an application programming interface API of the second target cloud platform corresponding to each cloud server; and a sending unit, configured to send, to the second target cloud platform, a resource monitoring request for the second target cloud platform by using the application programming interface API of the second target cloud platform, the resource monitoring request for the second target cloud platform being used for requesting to obtain resource monitoring data of each cloud server corresponding to the second target cloud platform.

In an implementation, the receiving module is specifically configured to:

receive a monitoring request on any one or more of a central processing unit CPU resource of a cloud server, a memory resource of a cloud server, an intranet bandwidth resource of a cloud server, or a magnetic disk resource of a cloud server in the hybrid cloud.

Figure 17:
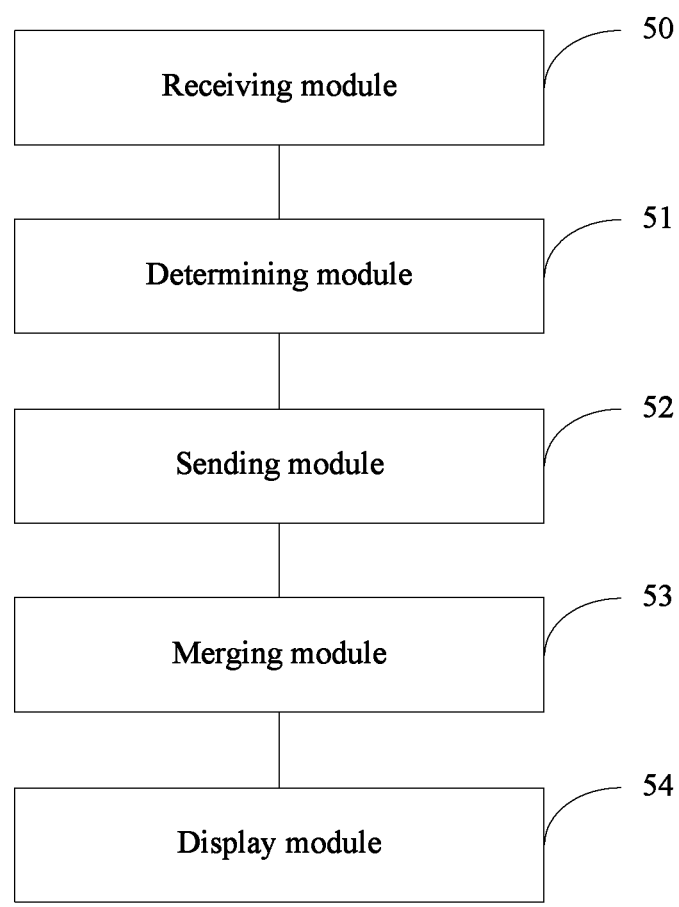
FIG. 17 is another structural block diagram of a resource monitoring system for a hybrid cloud according to an embodiment of this application.

In an implementation, FIG. 17 is another structural block diagram of a resource monitoring system for a hybrid cloud according to an embodiment of this application. With reference to FIG. 15, the resource monitoring system for a hybrid cloud further includes:

a display module 54, configured to display the resource monitoring data of the hybrid cloud after the merging resource monitoring data fed back by the second target cloud platform to obtain the resource monitoring data of the hybrid cloud.

The resource monitoring system for a hybrid cloud in the embodiment of this application includes: a receiving module, configured to receive a resource monitoring request for the hybrid cloud, the resource monitoring request for the hybrid cloud being used for requesting to obtain resource monitoring data of the hybrid cloud; a determining module, configured to determine at least one second target cloud platform of the hybrid cloud according to the resource monitoring request for the hybrid cloud; a sending module, configured to send, to the determined second target cloud platform, a resource monitoring request for the second target cloud platform, the resource monitoring request for the second target cloud platform being used for requesting to obtain resource monitoring data of the second target cloud platform; the receiving module, further configured to receive the resource monitoring data fed back by the second target cloud platform; and a merging module, configured to merge resource monitoring data fed back by the second target cloud platform to obtain the resource monitoring data of the hybrid cloud. Based on the foregoing system, the resource of the hybrid cloud can be uniformly monitored, and further improves efficiency of resource monitoring of the hybrid cloud.

In an implementation, the resource monitoring system for a hybrid cloud may be a hardware device, may alternatively be software, and may alternatively be hardware instruction software. The foregoing modules and units may be disposed in a functional module in the resource monitoring system for a hybrid cloud. FIG. 10 may alternatively be a structural block diagram of hardware of a resource monitoring apparatus for a hybrid cloud. Referring to FIG. 10, the resource monitoring system for a hybrid cloud may include: a processor 1, a communications interface 2, a memory 3 and a communications bus 4. The processor 1, the communications interface 2 and the memory 3 communicate with each other by using the communications bus 4. The communications interface 2 may be an interface of a communication module, for example, an interface of a GSM module.

The processor 1 is configured to execute a program. The memory 3 is configured to store a program. The program may include program code, and the program code includes a computer operation instruction.

The processor 1 may be a central processing unit (CPU) or an application specific integrated circuit (ASIC) or may be configured as one or more integrated circuits for implementing the embodiments of this application. The memory 3 may include a high-speed RAM memory, and may also include a non-volatile memory (non-volatile memory), for example, at least one magnetic disk memory.

The program may be specifically used for:

receiving a resource monitoring request for the hybrid cloud, the resource monitoring request for the hybrid cloud being used for requesting to obtain resource monitoring data of the hybrid cloud;

determining a second target cloud platform of the hybrid cloud according to the resource monitoring request for the hybrid cloud;

sending, to the second target cloud platform, a resource monitoring request for the second target cloud platform, the resource monitoring request for the second target cloud platform being used for requesting to obtain resource monitoring data of the second target cloud platform; and receiving the resource monitoring data fed back by the second target cloud platform.

The foregoing interface invocation method for a hybrid cloud and the resource monitoring method for a hybrid cloud may be combined with each other provided that there is no conflict Each embodiment in the specification is described in a progressive manner. The same or similar parts in the embodiments are just references to each other. Every embodiment illustrates in emphasis what is different from the other embodiments. The apparatus disclosed in the embodiments corresponds to the method disclosed in the embodiments and therefore is briefly described, and reference may be made to descriptions of the method part for a related part.

A person skilled in the art may further be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

In combination with the embodiments herein, steps of the method or algorithm described may be directly implemented using hardware, a software module executed by a processor, or the combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium (e.g., a non-transitory computer readable storage medium) known in the art.

For the foregoing descriptions of the disclosed embodiments, a person skilled in the art can implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. An interface invocation method for a hybrid cloud performed at a computing system having one or more processors and memory storing a plurality of programs to be performed by the one or more processors, the method comprising:

receiving, from an invoker, an interface invocation request for the hybrid cloud, the interface invocation request including a uniform resource locator (URL) address and information of a first target cloud platform, wherein the hybrid cloud hosts a plurality of cloud platforms including the first target cloud platform, and each cloud platform is accessed via a respective interface portal of a respective application programming interface (API), wherein each of the plurality of cloud platforms is associated with a geographical region having a unique geographical region parameter;

in accordance with the interface invocation request, providing an access to the first target cloud platform, including:

determining a type of the first target cloud platform according to a cloud platform type parameter in the URL address;

determining a geographical region where the interface portal of the first target cloud platform is available according to a geographical region parameter in the URL address;

identifying the interface portal of the respective API of the first target cloud platform among the plurality of cloud platforms hosted by the hybrid cloud based on the type of the first target cloud platform and the geographical region of the interface portal of the first target cloud platform; and sending the interface invocation request to the interface portal of the first target cloud platform;

receiving a response from the interface portal of the first target cloud platform;

forwarding the response to the invoker in response to the interface invocation request;

sending a plurality of resource monitoring requests to a plurality of second target cloud platforms hosted by the hybrid cloud;

receiving respective resource monitoring data from the plurality of second target cloud platforms in response to the plurality of resource monitoring requests; and merging the respective resource monitoring data from the plurality of second target cloud platforms to obtain merged resource monitoring data of the hybrid cloud.

2. The method according to claim 1, further comprising:
prior to providing the access to the first target cloud platform:
authenticating the interface invocation request; and
when the authentication succeeds, providing the access to the first target cloud platform according to the interlace invocation request.

3. The method according to claim 2, wherein the interface invocation request further comprises a request type HTTP Method, and the method further comprises:
receiving an HTTP header sent by the invoker, the HTTP header comprising a timestamp parameter Timestamp, a platform authentication code AppKey, a user authentication code AccessKey, and a signature string Signature; and
the authenticating the interface invocation request comprises:
obtaining a key parameter SecretKey preallocated to the invoker;
authenticating the signature string Signature by using the key parameter SecretKey;
obtaining a character string comprising a request type HTTP Method, a timestamp parameter Timestamp, a URL address, a platform authentication code AppKey, and a user authentication code AccessKey; and
determining that the authenticating is successful when the request type HTTP Method in the character string is consistent with the request type in the interface invocation request, the URL address in the character string is consistent with the URL address in the interface invocation request, the timestamp parameter Timestamp in the character string is consistent with the timestamp parameter Timestamp in the HTTP header, the platform authentication code AppKey in the character string is consistent with the platform authentication code AppKey in the HTTP header, and the user authentication code AccessKey in the character string is consistent with the user authentication code AccessKey in the HTTP header.

4. The method according to claim 1, further comprising:
receiving a resource monitoring request for the hybrid cloud, the resource monitoring request including a request to obtain resource monitoring data of the hybrid cloud;
determining a second target cloud platform of the hybrid cloud according to the resource monitoring request;
sending the resource monitoring request to the second target cloud platform; and
receiving the resource monitoring data from the second target cloud platform.

5. The method according to claim 4, wherein the hybrid cloud comprises a plurality of cloud servers, and wherein the determining the second target cloud platform of the hybrid cloud according to the resource monitoring request comprises:
reading instance ID information, which is comprised in the resource monitoring request for the hybrid cloud, of each cloud server of the plurality of cloud servers in the hybrid cloud;
calling a resource information table generated when the hybrid cloud is created; and
determining, according to the instance ID information of each cloud server in the hybrid cloud and the resource information table, an access address of a second target cloud platform corresponding to each cloud server in the hybrid cloud to obtain an access address of the second target cloud platform of the hybrid cloud.

6. The method according to claim 5, wherein the determining, according to the instance ID information of each cloud server in the hybrid cloud and the resource information table, an access address of a second target cloud platform corresponding to each cloud server in the hybrid cloud to obtain an access address of the second target cloud platform of the hybrid cloud comprises:
reading, from the resource information table, equipment room information corresponding to the instance ID information of each cloud server in the hybrid cloud, the equipment room information comprising the access address of the second target cloud platform corresponding to each cloud server in the hybrid cloud; and
determining, according to the equipment room information corresponding to the instance ID information of each cloud server in the hybrid cloud, the access address of the second target cloud platform corresponding to each cloud server in the hybrid cloud.

7. The method according to claim 6, wherein the sending, to the second target cloud platform, a resource monitoring request for the second target cloud platform comprises:
determining, according to the access address of the second target cloud platform corresponding to each cloud server, an application programming interface API of the second target cloud platform corresponding to each cloud server; and
sending, to the second target cloud platform, a resource monitoring request for the second target cloud platform by using the application programming interface API of the second target cloud platform, the resource monitoring request for the second target cloud platform being used for requesting to obtain resource monitoring data of each cloud server corresponding to the second target cloud platform.

8. The method according to claim 1, wherein the receiving a resource monitoring request for the hybrid cloud comprises:
receiving a monitoring request on any one or more of a central processing unit CPU resource of a cloud server, a memory resource of a cloud server, an intranet bandwidth resource of a cloud server, or a magnetic disk resource of a cloud server in the hybrid cloud.

9. An interface invocation apparatus for a hybrid cloud, comprising:
one or more processors; and
memory storing one or more programs and one or more modules to be executed by the one or more processors, the one or more programs and the one or more modules comprising:
a receiving module, configured to:
receiving, from an invoker, an interface invocation request for the hybrid cloud, the interface invocation request including a uniform resource locator (URL) address and information of a first target cloud platform, wherein the hybrid cloud hosts a plurality of cloud platforms including the first target cloud platform, and each cloud platform is accessed via a respective interface portal of a respective application programming interface (API), wherein each of the plurality of cloud platforms is associated with a geographical region having a unique geographical region parameter;
receive a response from the interface portal of the first target cloud platform;
a determining module, configured to provide an access to the first target cloud platform according to the interface invocation request, including a type determining unit, configured to determine a type of the first target cloud platform according to a cloud platform type parameter in the URL address;
a geographical region determining unit, configured to determine a geographical region where the interface portal of the first target cloud platform is available according to a geographical region parameter in the URL address; and
a target-cloud-platform interface determining unit, configured to identify the interface portal of the respective API of the first target cloud platform among the plurality of cloud platforms hosted by the hybrid cloud based on the type of the first target cloud platform and the geographical region of the interface portal of the first target cloud platform;
a sending module, configured to send the interface invocation request to the interface portal of the first target cloud platform in accordance with the determining and forward the response to the invoker in response to the interface invocation request; and send a plurality of resource monitoring requests to a plurality of second target cloud platforms hosted by the hybrid cloud;
the receiving module further configured to receive respective resource monitoring data from the plurality of second target cloud platforms in response to the plurality of resource monitoring requests; and
a merge module, configured to merge the respective resource monitoring data from the plurality of second target cloud platforms to obtain merged resource monitoring data of the hybrid cloud.

10. The apparatus according to claim 9, further comprising:
an authentication module, configured to:
authenticate the interface invocation request prior to providing the access to the first target cloud platform according to the interface invocation request; and
trigger the determining module to provide the access to the first target cloud platform according to the interface invocation request if the authentication succeeds.

11. The apparatus according to claim 10, wherein the interface invocation request further comprises a request type HTTP Method, and the authentication module comprises:
a receiving unit, configured to receive an HTTP header sent by the invoker, the HTTP header comprising a timestamp parameter Timestamp, a platform authentication code AppKey, a user authentication code AccessKey, and a signature string Signature; and
a query unit, configured to obtain a key parameter SecretKey preallocated to the invoker; and
a processing unit, configured to attempt to authenticate the signature string Signature by using the key parameter SecretKey, and obtaining a character string comprising a request type HTTP Method, a timestamp parameter Timestamp, a URL address, a platform authentication code AppKey, and a user authentication code AccessKey; and determine that the authentication succeeds when the request type HTTP Method in the character string is consistent with the request type in the interface invocation request, the URL address in the character string is consistent with the URL address in the interface invocation request, the timestamp parameter Timestamp in the character string is consistent with the timestamp parameter Timestamp in the HTTP header, the platform authentication code AppKey in the character string is consistent with the platform authentication code AppKey in the HTTP header, and the user authentication code AccessKey in the character string is consistent with the user authentication code AccessKey in the HTTP header.

12. The apparatus according to claim 9, wherein:
the receiving module is configured to receive a resource monitoring request for the hybrid cloud, the resource monitoring request including a request to obtain resource monitoring data of the hybrid cloud;
the determining module is configured to determine a second target cloud platform of the hybrid cloud according to the resource monitoring request;
the sending module is configured to send, to the second target cloud platform, the resource monitoring request; and
the receiving module is further configured to receive the resource monitoring data from the second target cloud platform.

13. The apparatus according to claim 12, wherein the determining module comprises:
an instance ID information reading unit, configured to read instance ID information of each cloud server in the hybrid cloud from the resource monitoring request for the hybrid cloud;
a resource information table calling unit, configured to call a resource information table generated when the hybrid cloud is created; and
an access address determining unit, configured to determine, according to the instance ID information of each cloud server in the hybrid cloud and the resource information table, an access address of a second target cloud platform corresponding to each cloud server in the hybrid cloud to obtain an access address of the second target cloud platform of the hybrid cloud.

14. The apparatus according to claim 13, wherein the access address determining unit is further configured to:
   read, from the resource information table, equipment room information corresponding to the instance ID information of each cloud server in the hybrid cloud, the equipment room information comprising the access address of the second target cloud platform corresponding to each cloud server in the hybrid cloud; and
   determine, according to the equipment room information corresponding to the instance ID information of each cloud server in the hybrid cloud, the access address of the second target cloud platform corresponding to each cloud server in the hybrid cloud.

15. A non-transitory computer readable storage medium storing one or more programs, the one or more programs comprising instructions, which, when executed by an apparatus, cause the apparatus to:
   receive, from an invoker, an interface invocation request for a hybrid cloud, the interface invocation request including a uniform resource locator (URL) address and information of a first target cloud platform, wherein the hybrid cloud hosts a plurality of cloud platforms including the first target cloud platform, and each cloud platform is accessed via a respective interface portal of a respective application programming interface (API), wherein each of the plurality of cloud platforms is associated with a geographical region having a unique geographical region parameter;
   in accordance with the interface invocation request, provide an access to the first target cloud platform, including:
      determine a type of the first target cloud platform according to a cloud platform type parameter in the URL address;
      determine a geographical region where the interface portal of the first target cloud platform is available according to a geographical region parameter in the URL address;
      identify the interface portal of the respective API of the first target cloud platform among the plurality of cloud platforms hosted by the hybrid cloud based on the type of the first target cloud platform and the geographical region of the interface portal of the first target cloud platform; and
      send the interface invocation request to the interface portal of the first target cloud platform;
   receive a response from the interface portal of the first target cloud platform;
   forward the response to the invoker in response to the interface invocation request;
   send a plurality of resource monitoring requests to a plurality of second target cloud platforms hosted by the hybrid cloud;
   receive respective resource monitoring data from the plurality of second target cloud platforms in response to the plurality of resource monitoring requests; and
   merge the respective resource monitoring data from the plurality of second target cloud platforms to obtain merged resource monitoring data of the hybrid cloud.

16. The computer readable storage medium of claim 15, further comprising instructions for:
   prior to providing the access to the first target cloud platform:
      authenticate the interface invocation request; and
      when the authentication succeeds, provide the access to the first target cloud platform according to the interface invocation request.

17. The computer readable storage medium of claim 16, wherein the interface invocation request further comprises a request type HTTP Method, and the computer readable storage medium further comprises instructions for:
   receiving an HTTP header sent by the invoker, the HTTP header comprising a timestamp parameter Timestamp, a platform authentication code AppKey, a user authentication code AccessKey, and a signature string Signature; and
   the authenticate the interface invocation request comprises instructions for:
      obtaining a key parameter SecretKey preallocated to the invoker;
      authenticating the signature string Signature by using the key parameter SecretKey;
      obtaining a character string comprising a request type HTTP Method, a timestamp parameter Timestamp, a URL address, a platform authentication code AppKey, and a user authentication code AccessKey; and
      determining that the authenticating is successful when the request type HTTP Method in the character string is consistent with the request type in the interface invocation request, the URL address in the character string is consistent with the URL address in the interface invocation request, the timestamp parameter Timestamp in the character string is consistent with the timestamp parameter Timestamp in the HTTP header, the platform authentication code AppKey in the character string is consistent with the platform authentication code AppKey in the HTTP header, and the user authentication code AccessKey in the character string is consistent with the user authentication code AccessKey in the HTTP header.

18. The computer readable storage medium of claim 15, further comprising instructions for:
   receiving a resource monitoring request for the hybrid cloud, the resource monitoring request including a request to obtain resource monitoring data of the hybrid cloud;
   determining a second target cloud platform of the hybrid cloud according to the resource monitoring request;
   sending the resource monitoring request to the second target cloud platform; and
   receiving the resource monitoring data from the second target cloud platform.

19. The computer readable storage medium of claim 15, further comprising instructions for:
   receiving a resource monitoring request for the hybrid cloud, the resource monitoring request including a request to obtain resource monitoring data of the hybrid cloud;
   determining a second target cloud platform of the hybrid cloud according to the resource monitoring request;
   sending the resource monitoring request to the second target cloud platform; and
   receiving the resource monitoring data from the second target cloud platform.

20. The computer readable storage medium of claim 19, wherein the hybrid cloud comprises a plurality of cloud servers, and wherein the determining the second target cloud platform of the hybrid cloud according to the resource monitoring request comprises:

reading instance ID information, which is comprised in the resource monitoring request for the hybrid cloud, of each cloud server of the plurality of cloud servers in the hybrid cloud;

calling a resource information table generated when the hybrid cloud is created; and determining, according to the instance ID information of each cloud server in the hybrid cloud and the resource information table, an access address of a second target cloud platform corresponding to each cloud server in the hybrid cloud to obtain an access address of the second target cloud platform of the hybrid cloud.

* * * * *